US007050246B2

(12) United States Patent
Hendriks (10) Patent No.: US 7,050,246 B2
(45) Date of Patent: May 23, 2006

(54) SCANNING DEVICE INCLUDING A PARTLY PLASTIC HIGH-NA OBJECTIVE SYSTEM (75) Inventor: Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/475,364

(22) PCT Filed: Apr. 25, 2002

(86) PCT No.: PCT/IB02/01372

§ 371 (c)(1),
(2), (4) Date: Oct. 21, 2003

(87) PCT Pub. No.: WO02/086875

PCT Pub. Date: Oct. 31, 2002

(65) Prior Publication Data
US 2004/0125466 A1 Jul. 1, 2004

(30) Foreign Application Priority Data
Apr. 25, 2001 (EP) ................................. 01201507
Oct. 15, 2001 (EP) ................................. 01203887

(51) Int. Cl.
*G02B 9/04* (2006.01)
*G02B 13/18* (2006.01)
*G11B 7/00* (2006.01)
(52) U.S. Cl. .................. 359/793; 369/112.24; 359/719
(58) Field of Classification Search ................ 359/717, 359/718, 719, 793, 796, 798; 369/112.24
See application file for complete search history.

(56) References Cited

U.S. PATENT DOCUMENTS

| 6,317,276 B1 * | 11/2001 | Braat .......................... 359/785 |
| 6,487,026 B1 | 11/2002 | Baartman et al. ............ 359/808 |
| 6,510,011 B1 | 1/2003 | Hendriks et al. ............ 359/823 |
| 2001/0038499 A1 | 11/2001 | Baartman et al. |

FOREIGN PATENT DOCUMENTS

| EP | 0800170 A2 | 10/1997 |
| EP | 1102251 | 5/2001 |
| EP | 1199717 A2 | 4/2002 |
| JP | 59083114 | 5/1964 |
| JP | 59202414 | 11/1964 |
| JP | 9138344 | 5/1997 |
| JP | 9185836 | 7/1997 |
| WO | WO 01/48745 A2 | 7/2001 |

OTHER PUBLICATIONS

International Search Report From PCT/IB 02/01371.

* cited by examiner

*Primary Examiner*—David N. Spector
(74) *Attorney, Agent, or Firm*—Michael E. Belk (57) ABSTRACT An optical scanning device for scanning an information layer (104) of an optical record carrier (102) includes a radiation source (110) for generating a radiation beam (108) and a high-NA objective system (118) for converging the radiation beam on the information layer. The objective system includes a first lens (116) and a second lens (117). The first lens includes a glass body and the second lens is made of plastic. The signs of the temperature-dependences of the spherical aberration of the first and second lens are different, thereby reducing the temperature-dependence of the spherical aberration of the objective system as a whole.

18 Claims, 6 Drawing Sheets

SCANNING DEVICE INCLUDING A PARTLY PLASTIC HIGH-NA OBJECTIVE SYSTEM

The invention relates to an optical scanning device for scanning an optical record carrier, to an objective system for use in such a scanning device and a method for manufacturing such an objective system.

In optical recording a higher information density on the optical record carrier must be accompanied by a smaller radiation spot for scanning the information. A smaller spot can be realised by a higher numerical aperture (NA) of the objective system used for focussing a radiation beam in the scanning device on the record carrier. An example of a high-NA objective system as used for instance in a so-called digital video recorder (DVR), includes two plano-aspherical lenses mounted in a cylindrical mount. The two lenses are made by the so-called glass-2P process. The objective system can be easily assembled and allows both tilt alignment and inter-lens distance adjustment without affecting the decentring of the two lenses (see U.S. Pat. No. 6,487,026 (PHNL000132) and U.S. Pat. No. 6,510,011 (PHNL000269)). The first lens facing the radiation source has a size which is similar to conventional lenses made for single-lens objective systems as used in the so-called DVD and CD-RW scanning devices. The second lens facing the record carrier is much smaller in size. A disadvantage of the known objective system is the difficult manufacture of the second lens using the glass-2P process. Another disadvantage is the relatively expensive assembly of three components, two lenses and a mount, to one objective system.

It is an object of the invention to reduce the manufacturing cost of the high-NA objective system. It is another object of the invention to maintain the possibility for tilt alignment and easy lens assembly without affecting the decentring of the lenses.

The first object is achieved, when according to the invention, the first lens of the objective system includes a glass body and the second lens is made of plastic and the signs of the temperature-dependences of the spherical aberration of the first and second lens are different. The first lens can be made in a conventional way, for example by glass moulding or by the glass-2P process. The second lens can be made by relatively low-cost plastic injection moulding.

A problem introduced by the use of a plastic component is the temperature stability of the objective system, the demands on which become higher with increasing numerical aperture. The invention resides partly in the recognition that a deviation of the temperature of a lens from the design temperature introduces spherical aberration as a main aberration or changes an already existing spherical aberration of the lens. To control the spherical aberration, the further insight is used, that the temperature-dependence of the spherical aberration of a lens (i.e. the derivative of the spherical aberration with respect to the temperature) can be made positive or negative. In other words, when the temperature of the objective system changes, an increase of the spherical aberration of one of the lenses of the objective system is accompanied by a decrease of the spherical aberration of the other lens. The counteracting changes of the spherical aberration of the two lenses compensate at least partially the temperature-dependence of the spherical aberration of the objective system as a whole.

The compensation is particularly advantageous for objectives systems having an NA higher than 0.65, which are relatively sensitive to temperature changes. The magnitudes of the temperature-dependence of the spherical aberration of the first and second lens are preferably made substantially equal, such that the temperature-dependent spherical aberration of the objective system as a whole induced by a 30 degree change in temperature is preferably lower than 30 m$\lambda$ after compensation, making the lens suitable for use in many demanding applications.

An advantage of the invention is that the temperature compensation does not require additional optical elements in the scanning device but can be incorporated in the two lenses of the objective system, which two lenses are already present because of manufacturing reasons. Moreover, a compensation within the objective system is preferred over a compensation by another optical element such as a collimator lens. Since the temperature of the objective system is determined in part by the heating of the actuator close to the objective system, the temperature of the collimator and the objective system need not be equal, resulting in an incorrect temperature compensation of the objective system by the collimator. This problem does not arise when the lenses of the objective system themselves are mutually compensated for temperature changes.

In a preferred embodiment the second lens is integrated with the mount for the first lens, so that the second lens and the mount can be made in one injection moulding process. The integration of the relatively small second lens and the mount eases the handling of the second lens. If the mount has a cylinder shape, then the mounting of the first lens in this cylindrical mount can be done in the same way as explained in U.S. Pat. No. 6,487,026. This method is possible when the glass body of the first lens (glass-2P lens) has a thickness which is larger than the radius of this glass body (see also U.S. Pat. No. 6,510,011). As a result a significant cost reduction is achieved, since the second lens can be manufactured easier with the injection moulding technique and there are now only two components which have to be assembled instead of three when the both lenses are glass-2P products. This achieves the second object of the invention.

The insight that the temperature-dependence of the amount of spherical wavefront aberration introduced by a lens is a function of the magnification of the lens can be used to adapt the magnification of the lens so as to give the temperature-dependence of its spherical aberration the desired sign.

The invention also relates to an optical scanning device for scanning an information layer of an optical record carrier, the device including a radiation source for generating a radiation beam and an objective system for converging the radiation beam on the information layer, the objective system including a first and a second lens, wherein, according to the invention, the first lens includes a glass body and the second lens is made of plastic and the signs of the temperature-dependence of the spherical aberration of the first and second lens are different.

A further aspect of the invention relates to a method for manufacturing an objective system having a numerical aperture larger than 0.65 for focussing a radiation beam having a wavelength $\lambda$ and including a first lens made of glass and a second lens made of plastic, including the steps of designing the objective system to have a temperature-dependence of the spherical aberration of less than 30 m$\lambda$ OPDrms for a temperature change of 30 K by making the signs of the temperature-dependence of the spherical aberration of the first and second lens different and the magnitudes of the temperature-dependence of the first and second lens substantially equal, manufacturing the first and second lens according to the design and assembling the first and second lens to an objective system.

The invention will now be described in greater detail by way of example with reference to the accompanying drawings in which.

Figure 1:
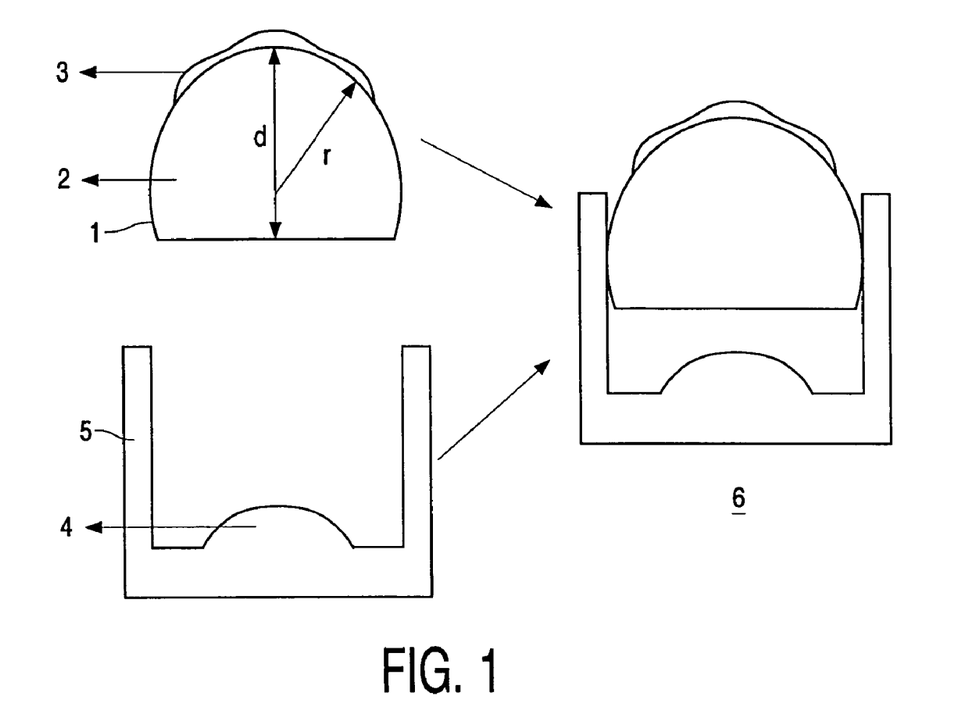
FIG. 1 shows an objective system consisting of two elements.

FIG. 1 shows an embodiment of the objective system according to the invention, which allows tilt alignment and easy lens assembly without affecting the decentring of the lenses. The objective system comprises a first lens which includes a substantially spherical lens body enclosing more than a half of this spherical lens body and a second lens made of plastic and a cylindrically shaped plastic mount. The optically effective diameter of the first lens is larger than that of the second lens. The first lens of the embodiment in the Figure is a glass-2P lens 1, made of a glass body 2 and a thin aspheric layer 3 of cured lacquer. The second lens 4 is integrated in a cylindrical mount 5 of the same plastic material to form a single constructive unit. The thickness d and the radius r of the spherical glass body of the first lens 1 complies with d>r. Element 6 is the objective system in the form of the assembled first lens, the mount and the second lens. In the Figure the radiation beam enters the objective system from the top, and the exiting beam focuses at a position below the objective system. The information layer of an optical record carrier may be arranged at this position for scanning this layer by the spot formed by the exiting beam.

The embodiment of the objective system of FIG. 1 has an entrance pupil diameter of 1.5 mm, a record-carrier-side numerical aperture NA=0.85, a design wavelength of 405 nm, a free working distance (FWD) between the lens and the disc of 0.15 mm, and a transparent layer of the record carrier made of PC with thickness 0.1 mm.

Figure 2:
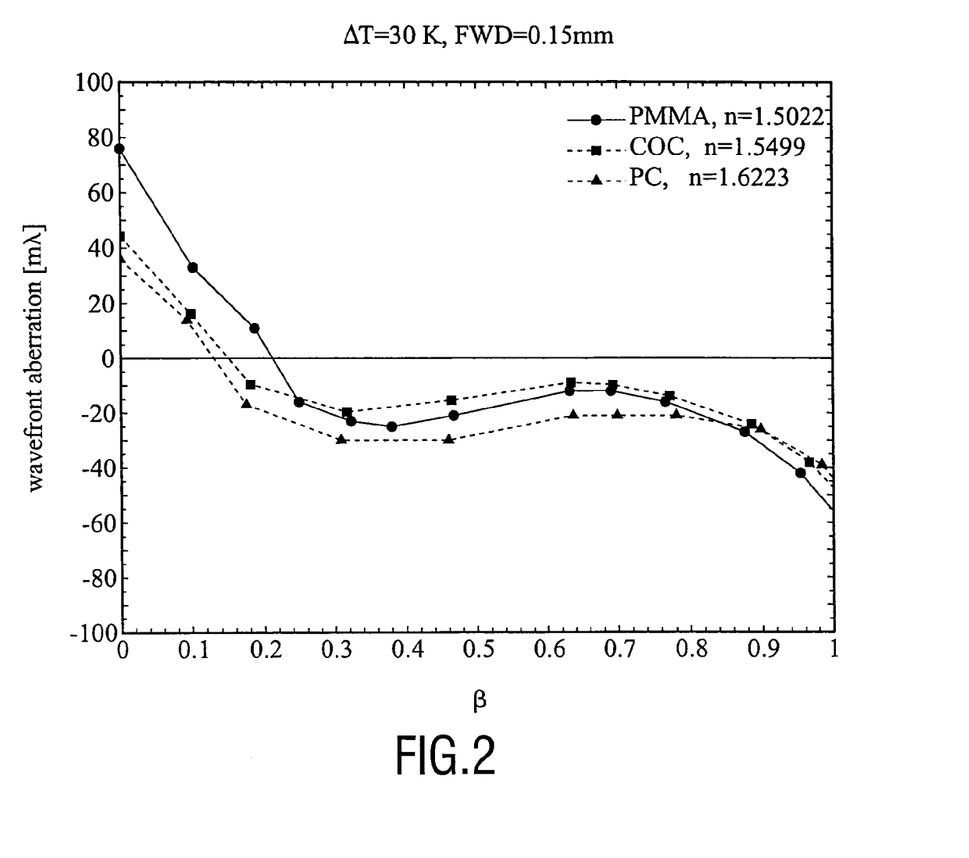
FIG. 2 shows the wavefront aberration OPDrms of the objective system arising due to a temperature rise of 30 K as a function of the magnification β of the second lens.

FIG. 2 shows the behaviour of the second lens when its temperature is changed. The Figure shows the change of the wavefront aberration of the entire objective system when the temperature of the second lens only is increased by 30 K. The aberration is plotted as a function of the magnification β of the second lens. When changing the magnification of the second lens, the imaging properties of the objective system as a whole are maintained by a corresponding change in the properties of the first lens and in the distance between the first and second lens. The wavefront aberration is presented as the well-known root-mean-square value of the optical path difference (OPDrms). A negative value of the OPDrms in the Figure means that the Zernike coefficient for spherical aberration, $A_{40}$, is negative. The three lines in the Figure show the behaviour of the aberration for the case that the second lens is made of polymethyl methacrylate (PMMA), cyclic olefin copolymer (COC) and polycarbonate (PC). The thermal properties of PMMA, COC and PC are given in Table I. The change in spherical wavefront aberration is positive and large for a lens having an infinite conjugate (β=0). For a magnification β greater than approximately 0.3 the wavefront aberration is negative. For 0.2<β<0.8 the wavefront aberration due to a temperature rise is relatively small. The reason for this is that the magnification is close to the range determined by the magnification corresponding to the Huygens aplanatic condition (β~1/n², with n refractive index of second lens) and the magnification corresponding to the centre of curvature condition (β~1/n). Since the glass-2P lens has a lower temperature dependence than the plastic lens, the magnification of the plastic lens in the high-NA objective design should be in the range 0.2<β<0.8 to achieve a low temperature dependence of the combination of the glass-2P lens and the plastic second lens.

TABLE I

Thermal properties of PMMA, COC and PC.

| | PMMA | COC | PC |
|---|---|---|---|
| n @ 405 nm | 1.5022 | 1.5499 | 1.6223 |
| dn/dT [$10^{-5}$/K] | −12.5 | −10.0 | −10.8 |
| Coeff. Lin. Expansion [$10^{-5}$/K] | 70 | 70 | 70 |

The invention allows the temperature tolerance of a glass-plastic high-NA objective to be made sufficiently wide for optical recording purposes, which will also become apparent from the following more detailed examples.

An embodiment of the objective system for use in a DVR scanning device operates at infinite conjugate; a first lens faces the radiation source of the scanning system and a second lens faces the record carrier. It is designed for focussing a collimated radiation beam having a wavelength of 405 nm to a focus on an information layer of an optical record carrier through a transparent layer of PC (n=1.6223) with thickness 0.1 mm and arranged on the information layer. The entrance pupil diameter is 3.0 mm and the numerical aperture of the objective NA=0.85. The free working distance is FWD=0.15 mm. The objective system consists of a plano-aspheric glass-2P first lens followed by a plano-aspheric second lens made of plastic. The glass body of the first lens is made of FK5 Schott glass (n=1.4989) with a thin aspheric lacquer layer on its surface and made of Diacryl (n=1.5987). The thickness on the optical axis of the first lens is fixed to 2.3 mm. Alternatively, the first lens may be made entirely of glass, using for example glass moulding. The design of the objective system is optimized for different materials and magnifications of the second lens using a merit function based on requirements regarding field tolerance, decentre tolerance of the two lenses, the tolerance for disc thickness variation with conjugate adjustment allowed and the temperature tolerance.

The embodiment of the objective system having a second lens of COC and a magnification β of 0.4 has the following design parameters. The first lens has a convex surface facing the radiation source and having a radius of curvature $R_{base}$ of 2.4 mm. The rotationally symmetrical aspherical shape of the lacquer layer on the convex surface is given by the equation:

$$s(\theta_N) = \sum_{i=1}^{8} a_{2i}\theta_n^{2i}$$

in which $$\theta_N = \theta \frac{R_{base}}{r_A}$$

and s is the deviation of the local thickness of the lacquer layer from its thickness at the optical axis and measured in millimeters along the normal to the surface on a point of the convex surface, $\theta$ is the angle between the optical axis and a radius from the centre of curvature of the convex surface to said point on the convex surface and measured in radians, $r_a$ is the semi-diameter of the convex surface measured in millimeters and $a_{2i}$ is the coefficient of the $2i^{th}$ power or $\theta$. The value of $r_a$ is equal to half the entrance pupil diameter. The thickness of the lacquer layer on the optical axis is 0.015 mm. The values of the coefficients $a_2$ to $a_{16}$ are 0.10705588, −0.22546373, 0.087850329, 0.079496556, −0.14937823, −0.21393161, −0.5056136 and 1.2663043, respectively. The boundary face of the first lens opposite the convex surface has an infinite radius of curvature. The second lens of the objective system is made of COC; it has a thickness of 1.363 mm on the optical axis and a distance of 0.100 mm to the first lens. The convex surface of the second lens directed towards the first lens has a rotationally symmetrical aspherical shape given by the equation:

$$z(r) = \sum_{i=1}^{8} b_{2i} r^{2i}$$

in which z is the position of the surface in the direction of the optical axis and measured in millimeters, r is the distance to the optical axis in millimeters, and $b_{2i}$ is the coefficient of the $2i^{th}$ power of r. The values of the coefficients $b_2$ to $b_{16}$ are 0.49982075, 0.12648361, −0.015903608, 0.27317405, −0.47765099, 0.39496049, −0.0085041792 and −0.10275875, respectively. The boundary face on the other side of the second lens has an infinite radius of curvature.

Figure 3:
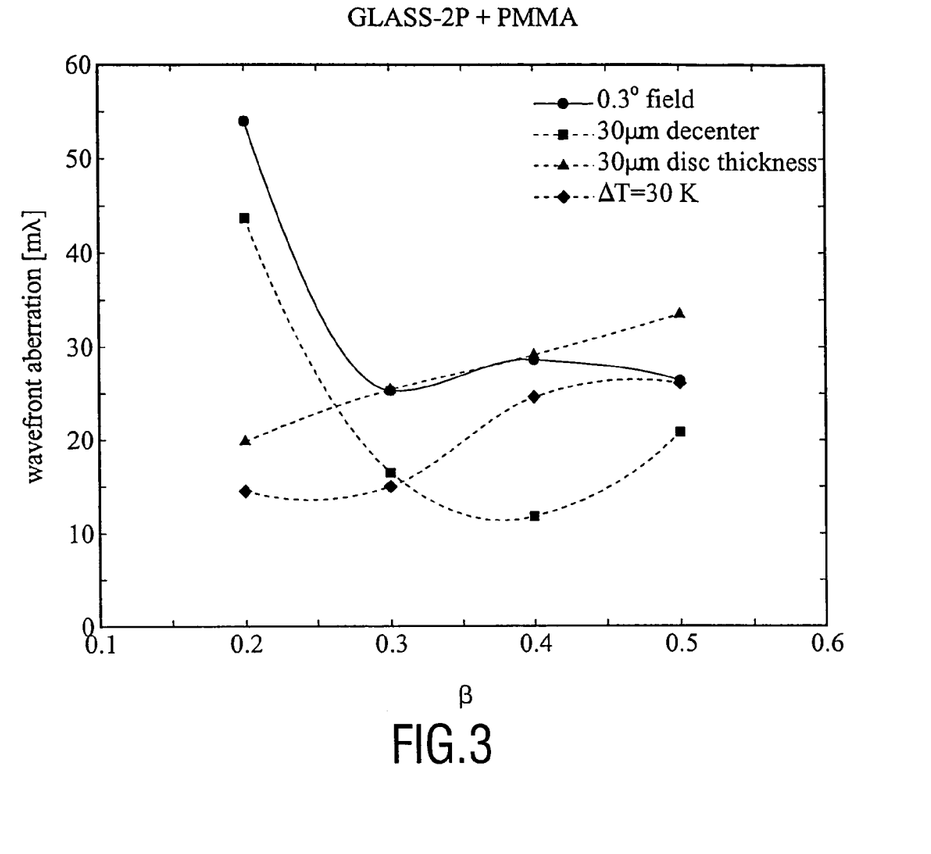
FIGS. 3, 4 and 5 show the wavefront aberration of the objective system when the second lens is made of PMMA, COC and PC, respectively, as a function of the magnification β of the second lens.
Figure 4:
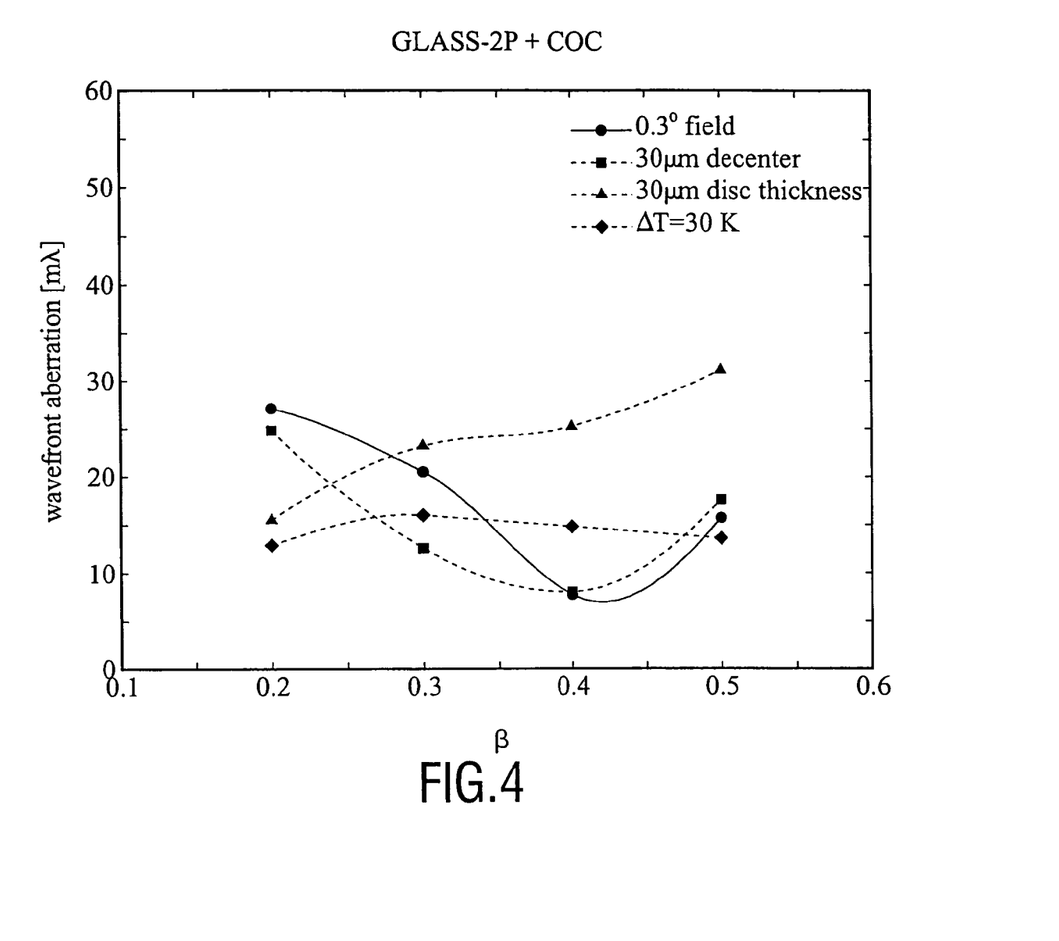
Figure 5:
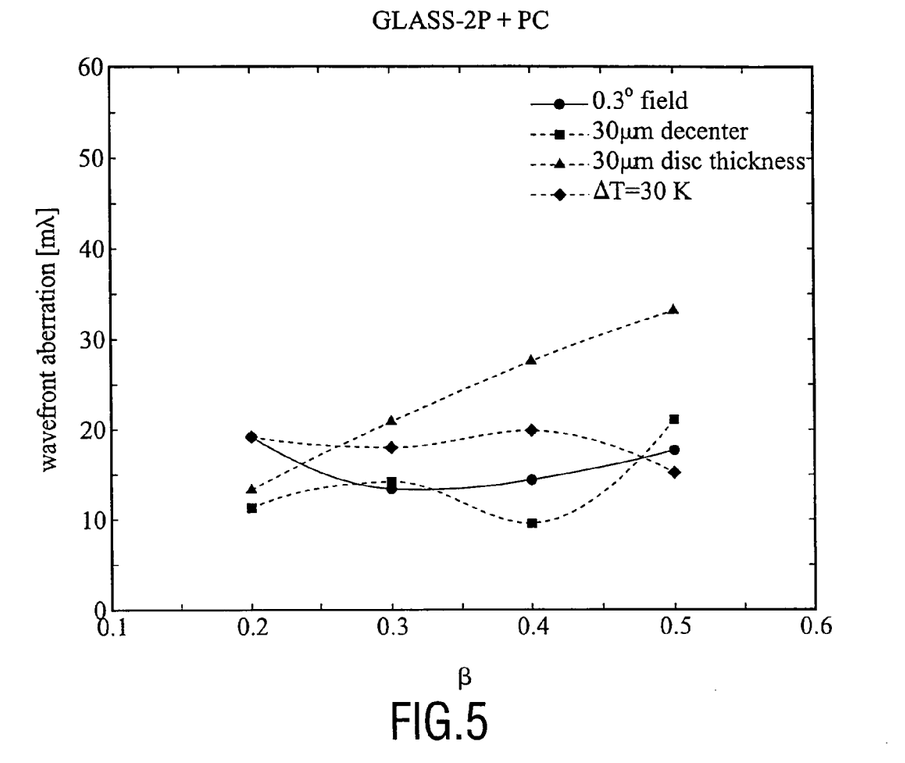

When analysing the temperature dependence of the optical properties of the objective system, the expansion of the mount made of the same material as the second element was taken into account. FIGS. 3, 4 and 5 show the change in wavefront aberration of the objective system when the second lens is made of PMMA, COC and PC, respectively, as a function of the magnification $\beta$ of the second lens element. Taking 30 m$\lambda$ OPDrms as the upper limit for the aberrations, $\beta$ is preferably smaller than 0.5 for all cases due to the combined effect of the temperature-induced spherical aberration and decentre tolerance. In the case of PMMA the field tolerance limits the magnification to $\beta$>0.26, while for COC and PC no further limitations arises.

For ease of manufacture the magnification $\beta$ of the second lens element must not be too small, because for small $\beta$ most of the optical power of the system is then present in the second lens, while the first lens has only small optical power. As a result the magnification $\beta$ must be larger than 0.3. When combined with the upper limit of the previous paragraph, a preferred range from 0.3 to 0.5 is obtained.

Furthermore, the Figures show that the best performance is obtained when using COC as plastic material for the second lens. In this case a good design is obtained when $\beta$ is in the range from 0.35 to 0.45, and preferably substantially equal to 0.4.

Although the above embodiments show the lens in the objective system having the smaller magnification to be closer to the radiation source than the lens having the larger magnification, the lens having the larger magnification may also be arranged closer to the radiation source than the lens having the smaller magnification.

The objective system can be used in a scanning device of an optical recording system, for instance in the so-called DVR optical system.

Figure 6:
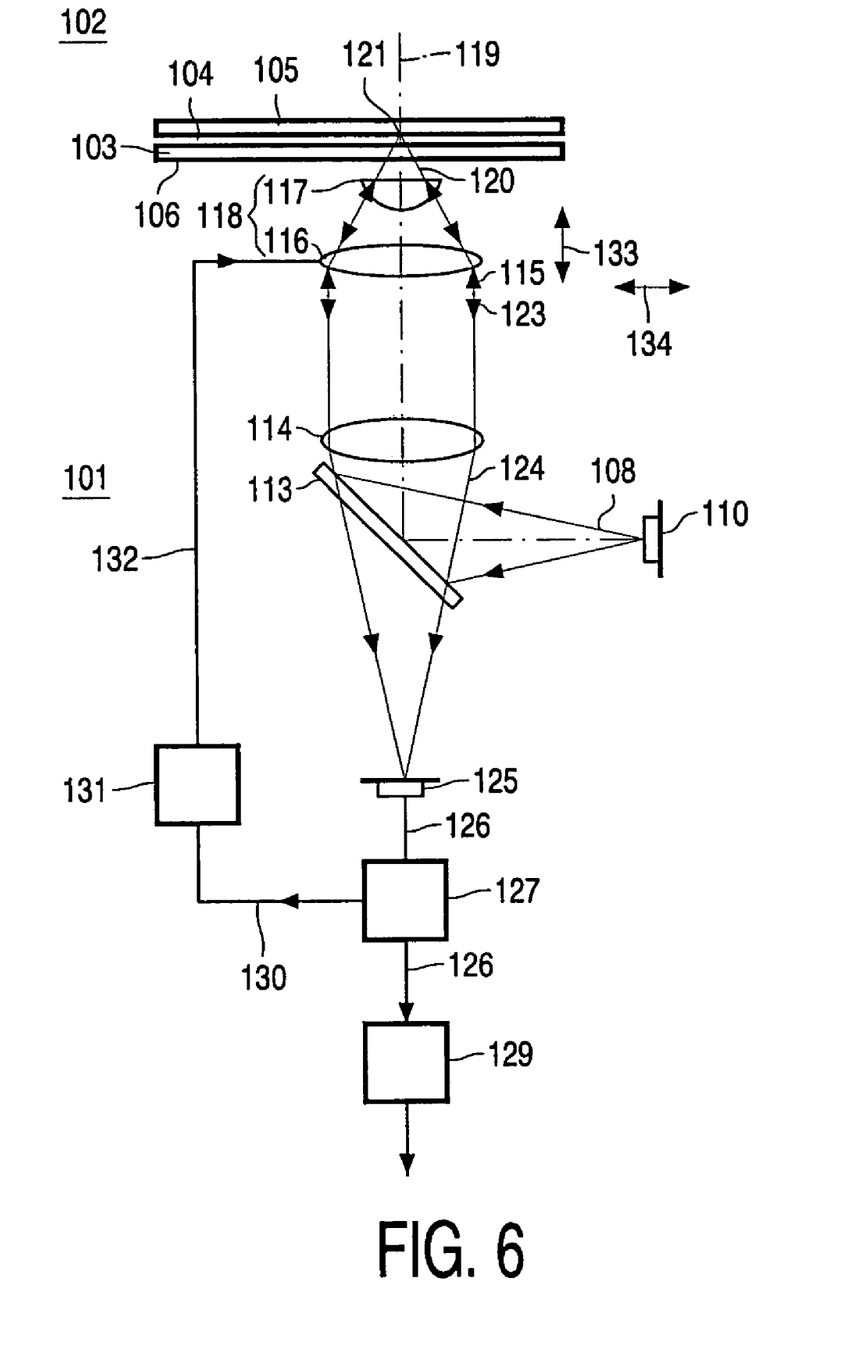
FIG. 6 shows a device for scanning an optical record carrier including an objective system.

FIG. 6 shows a device 101 for scanning an optical record carrier 102 of the DVR type. The record carrier comprises a transparent layer 103, on one side of which an information layer 104 is arranged. The side of the information layer facing away from the transparent layer is protected from environmental influences by a protection layer 105. The side of the transparent layer facing the device is called the entrance face 106. The transparent layer 103 acts as a substrate for the record carrier by providing mechanical support for the information layer. Alternatively, the transparent layer may have the sole function of protecting the information layer, while the mechanical support is provided by a layer on the other side of the information layer, for instance by the protection layer 105 or by a further information layer and a transparent layer connected to the information layer 104. Information may be stored in the information layer 104 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 101 comprises a radiation source that can emit a radiation beam 108. The radiation source shown in the Figure comprises a semiconductor laser 110. A beam splitter 113 reflects the diverging radiation beam 108 on the optical path towards a collimator lens 114, which converts the diverging beam 108 into a collimated beam 115. The collimated beam 115 is incident on a first lens 116 and subsequently on a second lens 117 of an objective system 118. The objective system may comprise two or more lenses and/or a grating. The objective system 118 has an optical axis 119. The objective system 118 changes the beam 115 to a converging beam 120, incident on the entrance face 106 of the record carrier 102. The objective system has a spherical aberration correction adapted for passage of the radiation beam through the thickness of the transparent layer 103. The converging beam 120 forms a spot 121 on the information layer 104. Radiation reflected by the information layer 104 forms a diverging beam, transformed into a substantially collimated beam 123 by the objective system 118 and subsequently into a converging beam 124 by the collimator lens 114. The beam splitter 113 separates the forward and reflected beams by transmitting at least part of the converging beam 124 towards a detection system 125. The detection system captures the radiation and converts it into electrical output signals 126. A signal processor 127 converts these output signals to various other signals. One of the signals is an information signal 128, the value of which represents information read from the information layer 104. The information signal is processed by an information processing unit for error correction 129. Other signals from the signal processor 127 are the focus error signal and radial error signal 130. The focus error signal represents the axial difference in height between the spot 121 and the information layer 104. The radial error signal represents the distance in the plane of the information layer 104 between the spot 121 and the centre of a track in the information layer to be followed by the spot. The focus error signal and the radial error signal are fed into a servo circuit 131, which converts these signals to servo control signals 132 for controlling a focus actuator and a radial actuator respectively. The actuators are not shown in the Figure. The focus actuator controls the position of the objective system 118 in the focus direction 133, thereby controlling the actual position of the spot 121 such that it coincides substantially with the plane of the information layer 104. The radial actuator controls the position of the objective lens 118 in a radial direction 134, thereby controlling the radial position of the spot 121 such that it coincides substantially with the centre line of a track to be followed in the information layer 104. The tracks in the Figure run in a direction perpendicular to the plane of the Figure.

The invention claimed is:

1. An optical scanning device for scanning an information layer of an optical record carrier, the device including a radiation source for generating a radiation beam, a collimating lens system for forming the radiation beam into a collimated radiation beam and an objective system for converging the collimated radiation beam on the information layer, the objective system including a first and a second lens, characterised in that the first lens includes a glass body and the second lens is made of plastic and the signs of the temperature-dependence of the spherical aberration of the first and second lens are different.

2. The optical scanning device according to claim 1, wherein the objective system has a numerical aperture larger than 0.65 and the magnitudes of the temperature-dependence of the spherical aberration of the first and second lens are substantially equal such that the temperature-dependence of the spherical aberration of the objective system is smaller than 30 m$\lambda$ OPDrms for a temperature change of 30 K.

3. The optical scanning device according to claim 1, including a detection system for converting radiation coming from the information layer to an information signal, and an information processing unit for error correction of the information signal.

4. An objective system including a first and a second lens for focussing a collimated radiation beam through a transparent layer on the optical record carrier and onto an information layer, characterised in that the first lens includes a glass body and the second lens is made of plastic and the signs of the temperature-dependences of the spherical aberration of the first and second lens are different.

5. The objective system according to claim 4, wherein the objective system has a numerical aperture larger than 0.65 and the magnitudes of the temperature-dependence of the spherical aberration of the first and second lens are substantially equal such that the temperature-dependence of the spherical aberration of the objective system is smaller than 30 m$\lambda$ OPDrms for a temperature change of 30 K.

6. The objective system according to claim 4, including a mount for the first lens, wherein the mount and the second lens are integrated into a single piece.

7. The objective system according to claim 4, wherein the first lens has a magnification $\beta$ smaller than 0.2 and the second lens has a magnification $\beta$ larger than 0.2.

8. The objective system according to claim 4, wherein the second lens has a magnification $\beta$ smaller than 0.6.

9. The objective system according to claim 4, wherein the second lens is made of cyclic olefin copolymer.

10. The objective system according to claim 9, wherein the second lens has a magnification $\beta$ in the range $0.35 < \beta < 0.45$.

11. A method for manufacturing an objective system having a numerical aperture larger than 0.65 for focussing a collimated radiation beam having a wavelength $\lambda$ and including a first lens made of glass and a second lens made of plastic, including the steps of designing the objective system to have a temperature-dependence of the spherical aberration of less than 30 rmk OPDrms for a temperature change of 30 K by making the signs of the temperature-dependence of the spherical aberration of the first and second lens different and the magnitudes of the temperature-dependence of the first and second lens substantially equal, manufacturing the first and second lens according to the design and assembling the first and second lens to an objective system.

12. The system of claim 4, wherein the plastic lens includes an aspherical layer of cured lacquer on the glass lens.

13. The system of claim 4, wherein both are aspherical.

14. The system of claim 13, wherein both lens are plano-aspherical.

15. The system of claim 4, wherein both lens have positive optical power.

16. A scanning device comprising:

at last one radiation source for providing a radiation beam;

at least one means for collimating the radiation beam from the radiation source and radiation reflected from a record carrier;

at least one objective system as recited in claim 4 and disposed to cause the collimated radiation beam to converge on the record carrier, the objective system inducing a spherical aberration adapted to correct for passage of the radiation beam through a transparent layer of the record carrier; and at least one means for detecting and processing reflected radiation from the record carrier.

17. The device of claim 16, further comprising at least one means for feeding back an error signal to the objective system; and at least one means for adjusting the lenses of the objective system responsive to the error signal to achieve better position or focus of the radiation beam on the record carrier.

18. The device of claim 16, wherein both lens are of the objective system have positive power and are plano-aspherical.

* * * * *